UNITED STATES PATENT OFFICE.

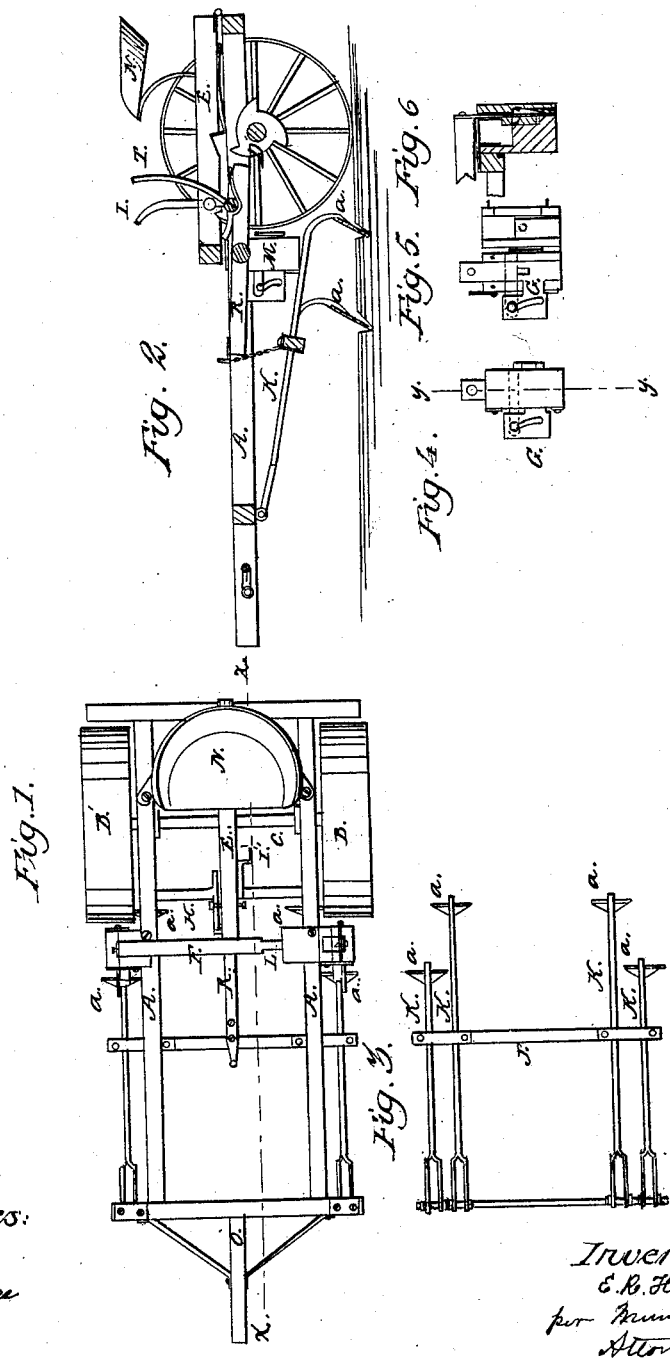

E. R. HOLFORD, OF WESTFORD, WISCONSIN, ASSIGNOR TO HIMSELF, ABIAH KINGSLEY, AND CLARK ALVORD, OF SAME PLACE.

IMPROVEMENT IN CORN-PLANTERS.

Specification forming part of Letters Patent No. 58,724, dated October 9, 1866.

*To all whom it may concern:*

Be it known that I, E. R. HOLFORD, of Westford, in the county of Dodge and State of Wisconsin, have invented a new and Improved Corn-Planter; and I do hereby declare that the following is a full, clear, and exact description thereof, which will enable others skilled in the art to make and use the same, reference being had to the accompanying drawings, forming part of this specification.

The nature of my invention consists in constructing, in a peculiar and novel manner, a slotted slide or valve to regulate the flow of seed from a corn-planter, in combination with a lever and cam or ratchet-wheel.

It also consists in the combination of elbow-levers in connection with a lever that is connected by a cross-bar that is attached to the covering teeth or plows.

Figure 1 is a top-plan view of my improved corn-planter. Fig. 2 is a longitudinal sectional elevation from the line $xx$. Fig. 3 shows the teeth or plows, and the manner by which they are secured together. Fig. 4 is a side elevation of the seed-box. Fig. 5 is also a side elevation of the seed-box with the door open. Fig. 6 is a transverse sectional elevation of Fig. 4 from the line Y Y.

Similar letters of reference indicate like parts.

In my improved corn-planter A represents a rectangular frame, made of wood and mounted upon wheels B B', which run upon the shaft C. The wheel B' is rigidly secured to the shaft C, and serves as a traction-wheel to drive the machine, as hereinafter described.

To the shaft or axle C is secured a cam or ratchet-wheel, Fig. 2.

At the center of the rear cross-piece of the frame A is hinged a lever, E, which extends forward longitudinally with the said frame A and immediately over the cam D, and connected to a cross-piece, F, the said cross-piece F being attached to the slotted slides or valves G G, Figs. 4 and 5.

H is a shaft or rod running transversely across the frame, and secured firmly thereto. To this rod H are attached elbow-levers I I'.

J is a cross-bar running transversely from one side of the frame to the other, through which the draft-rods K K K K pass, and by which the said rods and plows are elevated. To this cross-bar J is connected one end of a chain, and the other end to a lever or bar, R, which extends back, having its fulcrum or bearing upon the cross-rod L. M is a door, hung upon hinges. The said doors open into the seed-box, so that access may be had, if necessary.

N is the driver's seat, and O the tongue or pole to which the team is attached.

The operation of my improved corn-planter is very simple, being automatic in its dropping or distributing the seed, and covering and rolling the earth over it at the same time.

It will be seen that as the traction-wheel B' moves along it puts in motion the ratchet-wheel or cam D, which acts upon the lever or bar E, which is connected to the valves or slides by the cross-bar F, and is raised when the seed falls out, and the valves instantly close until the machine has proceeded far enough for another hill, and so on.

When the machine is drawn along the road, and it is not desired that the valves should work, they can be elevated by means of the lever I, so that the lever or bar E is thrown entirely out of contact of the cam, as also the plows may be elevated in the same manner by means of the lever I'.

By this machine corn may be rapidly and perfectly planted and covered.

Having thus described my invention, what I claim, and desire to secure by Letters Patent, is—

1. The cam D, in combination with the lever E and slides or valves G, for the purposes and substantially as described.

2. The cam D, in combination with the bar F, and levers I and I', for the purposes and substantially as herein set forth.

3. The arrangement of the levers I' and R, for the purpose of elevating and lowering the plows, substantially as herein described.

E. R. HOLFORD.

Witnesses:
    J. L. BURDGE,
    ABIAH STORK.